Dec. 10, 1963     H. R. PFLUMM ETAL     3,113,376
ALLOYING
Filed July 22, 1958     3 Sheets-Sheet 1
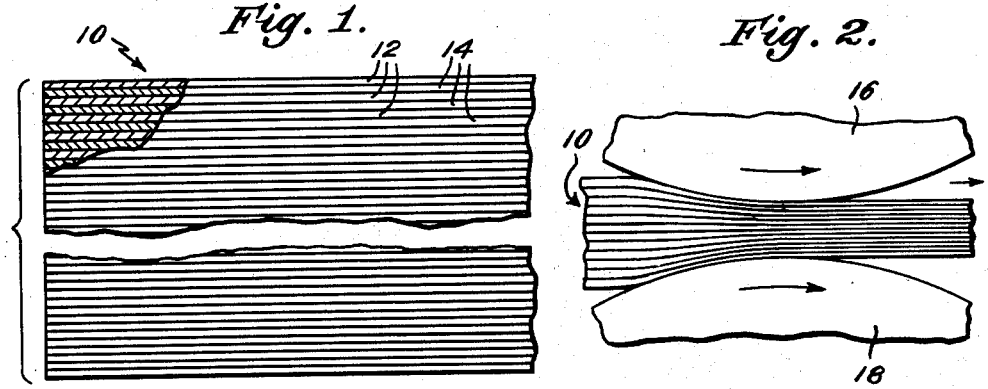
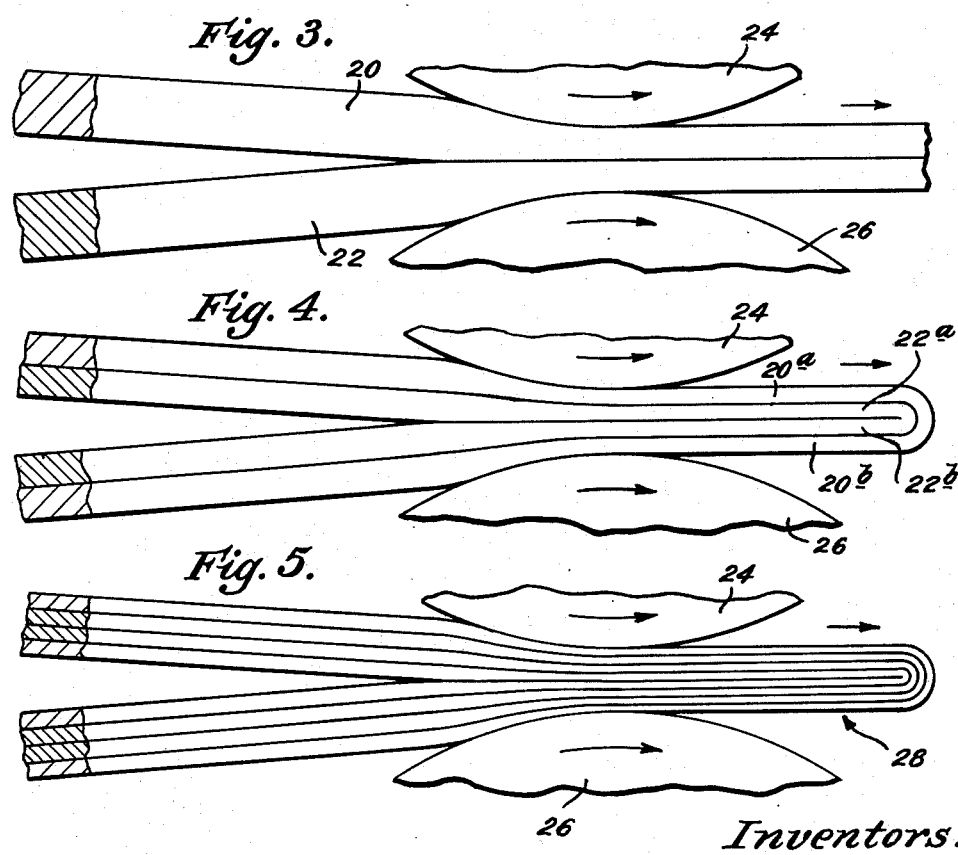
Inventors:
Heinz R. Pflumm,
George Durst,
Brian C. Coad,
by William W. Holloway,
Atty.

Dec. 10, 1963          H. R. PFLUMM ETAL          3,113,376
                           ALLOYING
Filed July 22, 1958                            3 Sheets-Sheet 2

Inventors:
Heinz R. Pflumm,
George Durst,
Brian C. Coad,
by William W. Jolley Jr.
                Atty.

Dec. 10, 1963 H. R. PFLUMM ETAL 3,113,376
ALLOYING

Filed July 22, 1958 3 Sheets-Sheet 3

Inventors:
Heinz R. Pflumm,
George Durst,
Brian C. Coad,
by William W. Vellon Jr.,
Atty.

United States Patent Office 3,113,376
Patented Dec. 10, 1963

3,113,376
ALLOYING
Heinz R. Pflumm, Plainville, and George Durst and Brian C. Coad, Attleboro, Mass., assignors to Texas Instruments, Incorporated, Dallas, Tex., a corporation of Delaware
Filed July 22, 1958, Ser. No. 750,138
6 Claims. (Cl. 29—471.1)

This invention relates to composite stock formed of a multi-layered assembly of alloying constituents capable of being subjected to a temperature in the solid state to form an alloy of said constituents, to a method of making the same, and to a method of providing an alloyed structure.

One important application of this method involves, by steps including mechanical working operations, the formation of alloyed structures which are brittle or otherwise incapable of being mechanically worked. Among the applications of this invention is also the important one of providing alloyed structures which are difficult or impossible to form by melting procedures due, for example, to lack of sufficient solubility of the alloying constituents in each other, segregation of one or more phases, one or more of the alloying constituents having an extremely high melting point, extreme differences between the melting points of the constituents, detrimental gas absorption during melting, etc. As the description proceeds, other applications of this invention will become apparent to those with only ordinary skill in the art.

Accordingly, an object of this invention is to provide new and improved composite stock and a method of making the same.

A further object of this invention is to provide a novel method of making alloyed structures.

A further object of this invention is to provide improved composite stock capable of being mechanically worked and capable in the solid state of being formed into an alloyed structure which is difficult or impossible to mechanically work, and to a method of making the same.

A further object of this invention is to provide improved composite stock capable in the solid state of being formed into alloyed structure which is difficult or impossible to form otherwise, and to a method of making the same.

A further object of this invention is to provide an improved method of making alloyed structures which are difficult or impossible to mechanically work, which method permits mechanical working of the structure before alloying and retention of the mechanically worked configuration during and after alloying.

A further object of this invention is to provide an improved method of making alloyed structures which are otherwise difficult or impossible to form.

Other objects will be in part obvious and in part pointed out hereinafter.

The invention accordingly comprises the compositions, steps and sequence of steps, and features of composition and manipulation, all of which will be exemplified in the structures and methods hereinafter described, and the scope of the application of which will be indicated in the following claims.

In the accompanying drawings, in which several of various possible embodiments of the invention are illustrated;

FIG. 1 is a fragmentary elevational view of a multi-layered stack according to a first embodiment of the invention;

FIG. 2 is an elevational fragmentary view depicting a multi-layered assembly being squeezed by rolling according to said first embodiment;

FIG. 3 is a fragmentary elevational view showing a squeezing and bonding step according to a second embodiment of the invention;

FIGS. 4 and 5 are views similar to FIG. 3 but which show successive squeezing and bonding passes after successively folding the stock upon itself;

Figure 6:
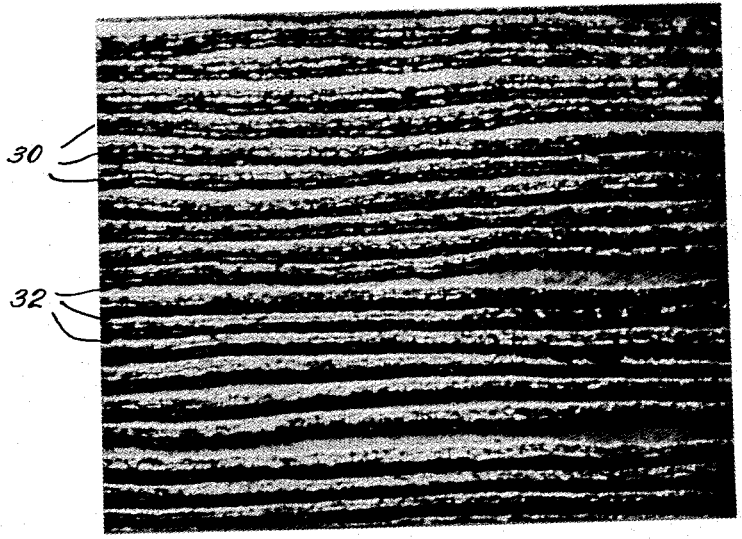
FIG. 6 is a reproduction of a photomicrograph showing on a greatly enlarged scale the structure of composite stock according to the invention before subjecting the latter to sufficient heat to form an alloy of the respective constituents in the solid state.
Figure 7:
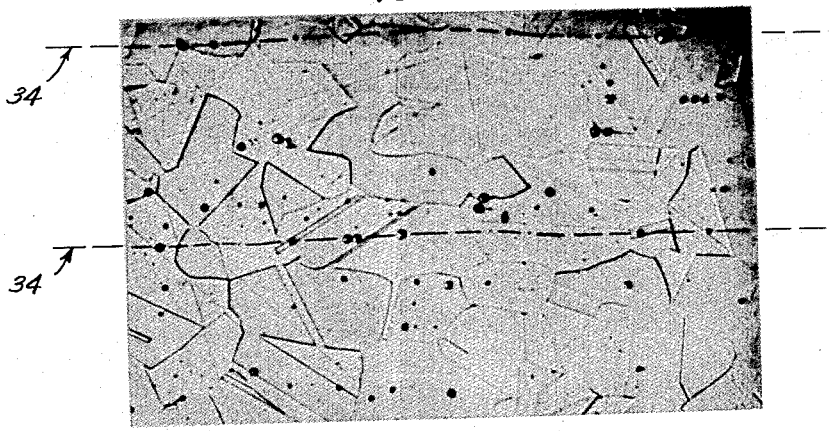
Figure 8:
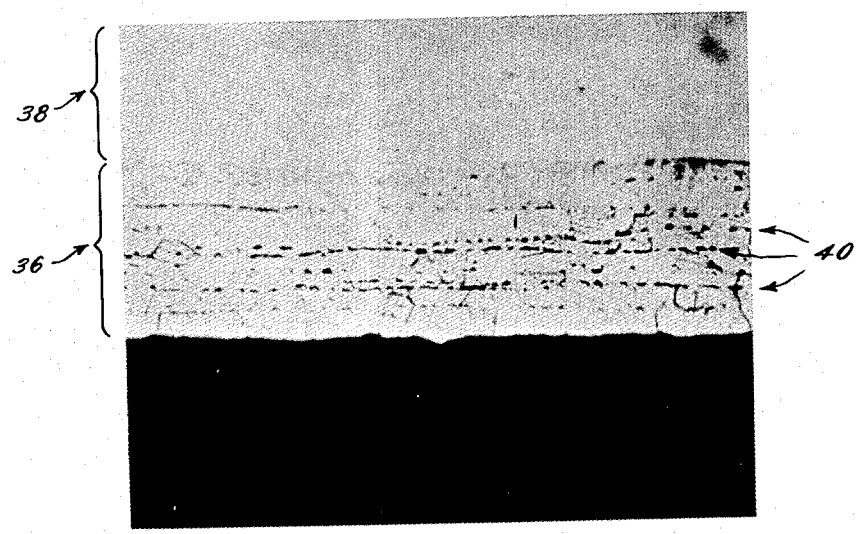

FIG. 7 is a reproduction of a photomicrograph showing on a greatly enlarged scale the structure of material the same as that of FIG. 6 after so subjecting the material to sufficient heat to form an alloy in the solid state; and FIG. 8 is a reproduction of a photomicrograph on a greatly enlarged scale showing another alloy structure formed according to the method of the invention and bonded to a base layer.

The methods of this invention involve the provision of multi-layered composite stock which, along with each of the layers thereof, has been reduced in thickness by squeezing and which, in the solid state, is subsequently subjected to heat to produce an alloyed structure. Each of the layers of the composite stock of this invention is formed of one of a plurality of metallic alloying constituents, and the layers of each of said constituents are interspersed with those of the other constituent or constituents.

In providing the composite stock, the mutually adjacent surfaces of the respective layers must be maintained in sufficiently intimate contact during reduction by squeezing of the respective layers and thereafter that the formation of diffusion-obstructing contaminants on these surfaces will be prevented. This intimate contact is advantageously effected by bonding these mutually adjacent surfaces to each other. This bond can be provided in any number of different ways such, for example, as by any one of electrodeposition, vapor-phase deposition, spraying, or dipping, by the hot-pressing step described with respect to FIG. 1 of U.S. Patent 2,834,102 to H. R. Pflumm et al. by the reduction by squeezing step effected by rolls 9 as described with respect to FIG. 1 of U.S. Patent 2,691,815 to H. W. Boessenkool et al. or by the reduction by squeezing step described with respect to rolls 15, 17 in FIG. 1 of U.S. Patent 2,753,623 to H. W. Boessenkool et al. With at least the least three bonding procedures mentioned in the immediately preceding sentence, the extent of diffusion of the atoms of one constituent into another can be limited to the extent that the diffusion is incapable of being detected by examination with a reflected-light microscope. When the invention is being utilized, for example, to form a mechanically worked structure which is to be alloyed in the solid state and which, when so alloyed, is brittle or otherwise incapable of being mechanically worked, the extent of diffusion of the respective constituents into each other before final mechanical working will be limited to less than that which renders the bonded assembly undesirably brittle or otherwise incapable of being effectively mechanically worked. When the invention is being utilized, for example, merely to avoid difficulties attendant upon melting of any phase, the extent of such diffusion prior to final mechanical working need not be limited.

In those cases where an initially formed bond between the layers cannot otherwise be relied upon to maintain the mutually adjacent surfaces of the layers in sufficiently intimate contact to prevent the formation thereon of diffusion-obstructing contaminants, such a bond can be improved or strengthened so as to be so relied upon. In this regard, where the initial bond is a "green" interatomic solid-phase bond such as results from the respective reduction by rolling step as described in each of U.S. Patents 2,691,815 and 2,753,623, this bond can be improved or perfected by heating the sub-assembly as respectively described in each of these patents. Where such a "green"

interatomic solid-phase bond is effected by the hot-pressing step as described in U.S. Patent 2,834,102, this bond can be improved or perfected by subsequent reduction by rolling and heating as also described in this patent. Where the initial bond is obtained by dipping, spraying, electrode position, etc., such a bond can, in many cases, be improved by subsequent reduction by squeezing with or without heating.

At least one of the constituents of the initially bonded assembly must be malleable so as to render the assembly malleable whereby the assembly and each of the layers will be capable of being reduced in thickness by squeezing. By way of example, when one or more of the constituents but not all of them are brittle, such brittle constituents may be provided in the form of powdered layers disposed between and bonded to layers of a malleable constituent so as to render the assembly malleable. During the step of solid-phase bonding the layers, each of the powdered layers will be integrated into a substantially solid layer by bonding of the individual powders to each other.

The bonded, malleable assembly of layers, each of which is disposed in sufficiently intimate contact with those adjacent thereto that diffusion-obstructing contaminants are unable to form on the mutually adjacent surfaces of the respective layers, can be provided in several ways. According to one procedure, a plurality of layers of each of the constituents is provided, and the opposite surfaces of each of the layers are cleaned sufficiently to permit bonding of the respective surfaces to each other. The extent and manner of cleaning of these surfaces varies according to the particular bond to be effected. By way of example and as brought out in U.S. Patent 2,834,102, it is not necessary that the cleaning for the bonding of this patent be as meticulous as that for the method of U.S. Patent 2,691,815. The layers with cleaned surfaces are stacked, layers of each of the constituents being interspersed with those of the other constituents. Referring to FIG. 1, a stack or assembly 10 is shown which is made up of two constituents, the layers 12 of one constituent being alternated with the layers 14 of another constituent. Of course, three or more constituents could be provided in similar manner, and, although preferable in many cases, it is not necessary that each layer of one constituent be disposed adjacent a layer formed of a different constituent (as will be apparent from the subsequent portion of this description relating particularly to FIGS. 3–5). The side edges of the stack 10 may be trimmed if desired at any convenient stage in the process. By way of example, the opposite surfaces of each of the layers of stack 10 may be cleaned according to the teaching of U.S. Patent 2,834,102, and the stack hot-pressed as described with respect to FIG. 1 of this patent to solid-phase bond the mutually adjacent surfaces of said layers to each other. In many cases this "green," initial solid-phase bond will be sufficient to maintain the mutually adjacent surfaces in sufficiently intimate contact that the formation on these surfaces of diffusion-obstructing contaminants will be prevented throughout the subsequent steps of the process.

The solid-phase bonded, malleable assembly is then squeezed to reduce the thickness of each of the layers. The squeezing can be performed by subjecting the assembly to one or more passes through a set of reducing rolls. This is depicted in FIG. 2 wherein reducing rolls 12 and 14 are shown in the process of reducing the thickness of each of the layers of stack 10. The stack 10 is shown with fewer layers in FIG. 2 than in FIG. 1 for the purposes of ease and clarity of illustration. The reduction in the thickness of the layers by squeezing effects not only cold-working of the respective constituents but also results in a decrease in the amount of heat required to form an alloy of said constituents during the subsequent step later to be described. To the point that the layers lose their individual identity, the greater the reduction by squeezing the less will be the amount of heat required to form an alloy of the respective constituents during the alloying step. The thickness to which each of the layers will be reduced varies in each particular case depending on such factors as the rate of diffusion of the particular constituents used. In many cases, the layers will be reduced to a thickness of approximately 0.000001 of an inch, and, in any case, the maximum allowable thickness to which each of the layers will be reduced is less than 0.001 of an inch.

The squeezing can be effected by one or more rolling steps which may be accompanied by intermediate anneals where desired or required. When heating the assembly for annealing, the length of the annealing time should be sufficiently limited and the temperature of the respective layers should be kept sufficiently low that diffusion which would adversely affect the properties of the assembly is avoided. This limitation on the length of the annealing time and on the magnitude of the annealing temperature does not hold, of course, in cases when, for example, the resulting alloy is malleable and the invention has been utilized solely because of melting difficulties.

The composite stock resulting from the squeezing step has considerable utility in that it can be further mechanically worked by cutting, punching, additional rolling to dimension and other shaping operations. By way of example, this composite stock can be delivered for further mechanical working operations as desired by the ultimate user who can subsequently carry out the final alloying step.

Referring particularly to FIGS. 3–5, another procedure according to the invention is depicted for providing the bonded, malleable assembly of layers. According to this procedure, two or more lengths are provided, each of the lengths being formed of one of the constituents of the alloy to be produced and the mutually adjacent surfaces of these lengths being bonded together by dipping, spraying, electrodeposition or any one of the bonding procedures described above with respect to U.S. Patents 2,691,815, 2,753,623 and 2,834,102. In FIG. 3, a layer 20 formed of one constituent and a layer 22 formed of another constituent are shown being squeezed by rolls 24, 26 to reduce the thickness of these layers and to form an initial solid-phase bond between the mutually adjacent surfaces thereof as described with respect to the reduction by rolling steps in either of U.S. Patents 2,691,815 and 2,753,623. Thereafter, the solid-phase bonded sub-assembly of layers 20 and 22 is folded upon itself, preferably but not necessarily, along a line substantially perpendicular to its length, and the step of solid-phase bonding the mutually adjacent surfaces of the folded sub-assembly and reducing the thickness of each of the layers is carried out as depicted in FIG. 4. It will be noted that with the product of the step shown in FIG. 4, layer 20 has been transformed into two layers 20a and 20b, layer 22 has been transformed into two layers, 22a and 22b, and the mutually adjacent surfaces of all of these layers are solid-phase bonded to each other. The sub-assembly product of the step shown in FIG. 4 is then again folded, the mutually adjacent surfaces of either one of layers 22a or 22b depending upon the direction of folding are so solid-phase bonded to each other, and the respective layers are reduced in thickness; and these steps are repeated until an assembly of a sufficient number of layers of sufficiently small thickness is produced. Of course, intermediate anneals as described with respect to the procedure depicted in FIGS. 1 and 2 can be carried out along with reductions by rolling not immediately preceded by a folding of the sub-assembly. With this procedure, it will be apparent that the formation of the stack of layers is effected along with formation of the solid-phase bonds therebetween and the reduction in thickness thereof.

By repeating the procedure of folding, solid-phase bonding and reducing the thickness of the layers only four times, for example, an assembly of 64 layers is provided when the initial sub-assembly before the first folding comprises only two layers. Obviously, when this initial sub-assembly comprises three layers, two of which could be formed of the same constituents or all three of which could be formed of different constituents, only three repetitions would result in an assembly of 48 layers and four repetitions would result in 96 layers.

The constituents of the squeezed and bonded assembly, however the latter is formed, are subsequently subjected to a sufficient amount of heat to form an alloy thereof in the solid state. The amount of heat is, of course, a function of the magnitude of the temperature and the length of time to which the composite stock is subjected. The temperature to which the composite stock is subjected must be within the range extending from just below the recrystallization temperature of the phase present having the lowest recrystallization temperature to just below the melting point of the phase present having the lowest melting point. Within this temperature range, solid-state diffusion of the atoms of each of the constituents, including self-diffusion as well as inter-diffusion, becomes comparatively rapid, and this diffusion is continued until an alloy of the respective constituents is formed. Above this temperature range a liquid phase will be produced. It has been found that the lower limit of the temperature range within which diffusion is comparatively rapid extends to a point just below rather than at the recrystallization temperature. The higher the temperature within this range to which the composite stock is subjected the lesser, of course, will be the length of time required to produce an alloy of the respective constituents.

Although the invention is not necessarily limited to subjecting the squeezed composite stock to temperatures within the above-mentioned range for only a relatively short time interval, it is frequently the case that only such a short time interval is required and this factor makes the invention not only practical in cases where it would not otherwise be but also highly advantageous in cases where different procedures would be more complicated and/or time-consuming. By "relatively short time interval" as used herein is meant less than 50 hours.

In those cases where at least one of the constituents is soluble in at least one other existing phase (each constituent will, of course, be soluble in itself), at least one of said soluble constituents will be diffused substantially completely throughout at least one other existing phase while subjecting the assembly to a temperature within said range. In many cases, each of the constituents will be soluble in all of the other existing phases, and although the step of subjecting the assembly to a temperature within said range may be carried out for only a sufficient length of time to diffuse one of said constituents completely throughout at least one of the other phases, each of the constituents will oftentimes be diffused completely throughout all of the other existing phases.

In those cases where at least one of the constituents is insoluble in all of the other existing phases, each of said insoluble constituents will be diffused to a state of heterogeneous equilibrium during the step of subjecting the assembly to a temperature within said range.

In any case, and regardless of whether each of the constituents is soluble in all of the other existing phases, each of the phases is insoluble in all of the other existing phases, or certain constituents are soluble in one or more but less than all of the existing phases and certain of the constituents are insoluble in the remaining existing phase or phases, the step of subjecting the assembly to a temperature within said range is carried out until an alloyed structure is formed.

The several examples described below manifest several of the many applications of the invention. All of the percentages named below are by weight of the whole.

*Example #1.—Alloy of 60% Palladium and 40% Copper*

The surfaces of 50 layers of palladium each 0.0054 of an inch thick and 50 layers of oxygen-free copper each 0.003 of an inch thick were cleaned as described in U.S. Patent 2,834,102, layers of each of these constituents were placed one on top of the other to form a stack of alternate layers, and the stack was solid-phase bonded by the hot-pressing step described in this last-mentioned U.S. patent. The bonded assembly was then squeezed by rolling to a thickness of 0.100 of an inch and annealed for three minutes at 1200° F., then squeezed by rolling to a thickness of 0.030 of an inch and annealed for three minutes at 1200° F., and then squeezed by rolling to a thickness of 0.010 of an inch and annealed at 1200° F. for ten minutes. A photomicrograph of a section etched with nitric acid was then made from one sample, and this photomicrograph is reproduced as FIG. 6 in the drawing. The original photomicrograph of which FIG. 3 is a full reproduction was four inches by five inches in size, and showed 20 alternate layers of each of the two constituents at a magnification of 1000 ×. The embodiment of composite stock according to the invention as shown in FIG. 3 was malleable and comprised alternate layers 30 and 32 of palladium and copper, respectively, with what is probably a very thin diffusion zone of palladium-copper alloy between each adjacent pair of layers. This illustrates that the composite stock of this invention includes those solid-phase bonded assemblies wherein diffusion between the layers has ensued to the extent that alloyed zones are detectable with a reflected-light microscope, but, in the case that the alloy is brittle or has other undesirable characteristics, sufficient diffusion has not taken place to imbue the composite stock as a whole with the undesirable characteristic(s). This malleable assembly was capable of being subjected to a temperature within the range extending from just below the recrystallization temperature of the phase having the lowest recrystallization temperature to just below the melting point of the phase having the lowest melting point to produce an alloy of said constituents in a relatively short time interval. This was done with a second sample by heating the latter for one hour at 1800° F. resulting in a microscopically homogeneous alloy as shown in FIG. 7. FIG. 7 is a reproduction of a photomicrograph of a section of this second sample of exactly the same magnification (even though of a smaller vertical dimension) as that of FIG. 6 but after said alloying heat treatment (and etching with nitric acid). In other words, the homogeneous structure as depicted in FIG. 7 results upon so heating the composite stock of FIG. 6, this by complete, solid-state diffusion of each of the constituents into the other.

The alloy of this example is difficult to mechanically work because it is brittle and is difficult to melt or to anneal due to oxidation and scale formation.

The small, dark-appearing particles 34 in FIG. 7 are believed to be impurities, and it is characteristic of alloys formed by the methods of this invention that roughly straight lines of such particles result which lie parallel to each other and apparently parallel to the respective layers before alloying.

*Example #2.—Alloy of 98.5% Silver and 1.5% Cobalt*

A layer of cobalt powder was evenly deposited on a solid layer of fine silver 0.0035 of an inch thick, another fine silver layer was placed on the layer of cobalt powder, another such layer of cobalt powder was deposited on the latter silver layer, and this was repeated until a 23-layer stack of 12 layers of fine silver and 11 layers of cobalt powder was provided. The cobalt powder and the surfaces of the silver layers having been cleaned beforehand, the stack was solid-phase bonded by the hot-pressing procedure described and claimed in U.S. Patent 2,834,102 whereby the particles of each of the cobalt layers were interatomically solid-phase bonded together to form substantially solid cobalt layers, and the mutually adjacent surfaces of each of the 23 layers were interatomically solid-phase bonded to each other. This hot-pressing step was carried out at 1500° F. for 20 minutes. The solid-phase bonded assembly was then squeezed by rolling to a thickness of 0.0025 of an inch with no intermediate annealing treatments, and then heated at 1600° F. for one hour resulting in heterogeneous equilibrium of the constituents being obtained and formation of an alloy of said constituents.

This alloy is ordinarily difficult to form because silver and cobalt are practically insoluble in each other.

*Example #3.—82% Gold, 18% Nickel Alloy*

A stack of 50 layers of 24 karat gold each 0.00075 of an inch thick alternated with 50 layers of "low carbon" nickel each 0.003 of an inch thick was formed and interatomically solid-phase bonded by the hot pressing step described in U.S. Patent 2,834,102. The assembly was then rolled hard to a thickness of 0.045 of an inch with an intermediate 1200° F. anneal at a thickness of 0.100 of an inch. This resulted in a solid-phase bonded multi-layered assembly having a pure gold surface at one side and a pure nickel surface at the opposite side. This assembly was bonded at the pure gold surface to an Inconel ingot 0.750 of an inch thick by the method described and claimed in U.S. Patent 2,834,102. (Inconel is a trademark for a high nickel-chromium iron alloy containing approximately 79.5% nickel, 13% chromium, 6.5% iron, 0.25% manganese, 0.25% silicon, 0.08% carbon and 0.20% copper.) This assembly was squeezed by rolling to a thickness of 0.010 of an inch with intermediate anneals for 20 minutes each at 1550° F. for each 60% reduction. The assembly was then heated for one hour at 1300° F. to form a completely homogeneous gold-nickel alloy bonded to a base of Inconel. FIG. 8 is a full reproduction of a photomicrograph of a section of the sample operated upon as described above. Referring to FIG. 8, reference numeral 36 designates the gold-nickel alloy and 38 designates the Inconel base to which the alloy structure is bonded. The dark, lowermost section of FIG. 8 is a portion of the plastic base in which the sample was embedded prior to etching with a solution of potassium cyanide plus ammonium persulfate. The original photomicrograph of which FIG. 8 is a full reproduction was four inches by five inches in size, and was at a 1000 × magnification. Characteristic lines of impurities can be seen in FIG. 8, at 40.

This alloy is difficult to mechanically work because, although its constituents are malleable as are those of Example #1, the allow itself is brittle.

*Example #4.—70% Gold, 30% Aluminum Alloy*

A stack of 50 layers of 24 karat gold each 0.0024 of an inch thick alternated with 50 layers of aluminum each 0.0075 of an inch thick was formed and solid-phase bonded by the hot-pressing step described in U.S. Patent 2,834,102, thereby to form a malleable assembly. The bonded assembly was then squeezed by rolling to a thickness of 0.0021 of an inch and then subjected to a temperature of 1000° F. for 10 minutes. This heating was just sufficient to diffuse the aluminum completely throughout the gold and not sufficient to effect diffusion of the gold completely throughout the aluminum whereby the resulting alloy was malleable. Had the heating step been continued sufficiently to diffuse the gold completely throughout the aluminum, the resulting alloy would have been so brittle that it would have pulverized very readily.

This example demonstrates that complete homogeneity need not be obtained with the methods of this invention even in those cases where each of the constituents is soluble in all existing phases.

This alloy has an attractive purple color and is useful in forming items of jewelry.

*Example #5.—40% Nickel, 60% Silver Alloy*

A stack was formed of 50 layers of nickel each 0.00448 of an inch thick alternated with 50 layers of fine silver each 0.0056 of an inch thick, and this stack was solid-phase bonded by the hot-pressing step described in U.S. Patent 2,834,102. The bonded assembly was then squeezed by rolling to a thickness of 0.010 of an inch with 1200 F. anneals at the respective thicknesses of 0.150, 0.050 and 0.020 of an inch. The finally squeezed assembly was subjected to a temperature of 1750° F. for 15 hours whereby heterogeneous equilibrium was attained and an alloy of these constituents was formed.

This alloy is impossible to form by conventional melting and mixing techniques because of the very low solubility of each of the constituents in the other.

*Example #6.—60% Gold, 32% Nickel and 8% Chromium Alloy*

A stack was built up by alternating 50 layers formed of an alloy of 80% nickel and 20% chromium each 0.006 of an inch thick with 50 layers of gold each 0.004 of an inch thick, and the stack was solid-phase bonded by hot-pressing at 1600° F. for 30 minutes in the manner described in U.S. Patent 2,834,102. The bonded assembly was rolled hard to a thickness of 0.033 of an inch with intermediate anneals at 1300° F. The side of the assembly having a pure gold surface was solid-phase bonded to an ingot of Inconel 0.750 of an inch thick by hot-pressing at 1650° F., and the assembly was squeezed by rolling to bring the multi-layered stack exclusive of the Inconel layer to a thickness of 0.020 of an inch with intermediate anneals at 1450° F. for from 30 to 60 minutes. The assembly was then subjected to a temperature of 1550° F. for one hour to form an alloy of the two constituents bonded to a base of Inconel.

This example demonstrates that one or more of the constituents or layers can itself be in alloy form.

This alloy is ordinarily difficult to mechanically work because it is quite brittle whereas the two constituents according to this example are malleable.

Another application of this invention is to produce alloyed structures which have the desired shape obtained by mechanical working procedures carried out before the alloying step. That is, for example, the composite stock of this invention can be mechanically worked to final dimension and conformation and this will be retained during and after the alloying step in contradistinction to melting procedures by which the dimensions and conformation before alloying are lost.

Any bonded assembly before final squeezing thereof according to this invention must be malleable or capable of being annealed to render it malleable in order that the respective layers of which the assembly is formed can be reduced in thickness by squeezing. Such assembly can be malleable by virtue of all of its layers or constituents being malleable, by virtue of sufficient ones of its layers being sufficiently malleable that the assembly will be so even though one or more of the respective constituents thereof are brittle or otherwise not malleable, or by virtue, for example, of certain of the layers being sufficiently malleable that, even though limited diffusion between layers has resulted in the formation of brittle diffusion zones, the overall assembly is still malleable. Accordingly, the composite stock according to this invention will in the same way be malleable or capable of being rendered malleable by annealing so that it can be further mechanically worked if desired prior to the step of alloying.

Among the advantages of this invention over powder metallurgy techniques are those that more uniform and greater density of the composite stock as well as of the alloyed product can ordinarily be obtained, the composite stock before alloying can, in most cases, be subjected to a greater degree of mechanical working without deleterious effect, and a bonded ingot can be provided which is malleable even though the alloy later formed is brittle whereas powdered material which is sintered to obtain a pseudo-solid, non-frangible mass is often as brittle or nearly so as though the respective constituents had been alloyed by melting.

It will be apparent to those skilled in the art that the composite stock according to the invention could be slit into lengths which could then be mechanically worked by rolling and drawing into rod or wire stock. As another illustration of the utility of the composite stock of the invention, the latter could be mechanically worked by drawing into the form of tubular stock.

The term "alloy" is used herein in the broad sense to denote compositions which exhibit characteristics which are different from the mean or average of the characteristics of each of its respective constituents such, for example, as microscopically homogeneous compositions, compositions having more than one constituent soluble in existing phases but less than all of which are completely diffused throughout said phases, macroscopically uniform distribution of phases not soluble in other phases, intermetallic compounds, etc. The term "constituent" is used herein as denoting material having metallic properties and which can be in elemental, alloyed or otherwise combined form. The term "interatomic" bond as used herein is intended to denote a bond which is formed by bringing the atoms of each of the parts to be bonded within the field of attraction of each other. The term "diffusion-obstructing" contaminants is intended herein to denote such contaminants as would prevent the effective formation of an alloy of the respective constituents upon subjecting the composite stock to heat as described above.

In view of the above, it will be seen that the several objects of the invention are achieved and other advantageous results attained.

As many changes could be made in the above structures and methods without departing from the scope of the invention, it is intended that all matter contained in the above description or shown in the accompanying drawings, shall be interpreted as illustrative and not in a limiting sense.

We claim:

1. The method comprising the steps of providing a malleable assembly of a plurality of metallic layers with mutually adjacent surfaces of said layers in sufficiently intimate contact to prevent the formation thereon of diffusion-obstructing contaminants, each layer being formed of one of a plurality of alloying constituents capable of forming an alloy by solid state interdiffusion and the layers of each of said constituents being interspersed with those of the other constituents; the layers of at least one of said alloying constituents being malleable and, while said layers are maintained in said intimate contact, squeezing the assembly to reduce each of said layers to a thickness sufficiently less than 0.001 of an inch that an alloy of said constituents is formed by subjecting the assembly for a relatively short time interval to a temperature within the range extending from just below the recrystallization temperature of the phase having the lowest recrystallization temperature to just below the melting point of the phase having the lowest melting point, said steps of providing and squeezing said malleable assembly being carried out by first bonding to each other at least one layer of each of said constituents to form a sub-assembly and then repeating, in succession, the steps of first folding said sub-assembly upon itself and subsequently bonding the mutually adjacent surfaces of the folded sub-assembly and reducing the thickness of each of the layers.

2. The method comprising the steps of providing a malleable assembly of a plurality of metallic layers, with mutually adjacent surfaces of said layers in sufficiently intimate contact to prevent the formation thereon of diffusion obstructing contaminants, each of said layers being formed of one of a plurality of alloying constituents capable of forming an alloy by solid state interdiffusion and the layers of each of said constituents being interspersed with those of the other constituents; the layers of at least one of said alloying constituents being malleable; while said layers are maintained in said intimate contact, cold working said assembly by squeezing the assembly to reduce the thickness of said layers to substantially less than 0.001 of an inch; said steps of providing and squeezing said malleable assembly being carried out by first bonding to each other at least one layer of each of said constituents to form a sub-assembly and then repeating, in succession, the steps of first superimposing a portion of said sub-assembly upon itself and subsequently bonding the mutually adjacent surfaces of the superimposed sub-assembly and reducing the thickness of each of the layers, and subjecting the assembly to a temperature within the range extending from just below the recrystallization temperature of the phase having the lowest recrystallization temperature to just below the melting point of the phase having the lowest melting point for a sufficient length of time to form an alloy of said constituents.

3. The method comprising the steps of providing a malleable assembly of a plurality of metallic layers with mutually adjacent surfaces of said layers bonded to each other, each layer being formed of one of a plurality of alloying constituents capable of forming an alloy by solid state interdiffusion and the layers of each of said constituents being interspersed with those of the other constituents; and cold working said assembly by squeezing the assembly to reduce each of said layers to a thickness sufficiently less than 0.001 of an inch that an alloy of said constituents can be formed by subjecting the assembly for a relatively short time interval to a temperature within the range extending from just below the recrystallization temperature of the phase having the lowest recrystallization temperature to just below the melting point of the phase having the lowest melting point, and the steps of providing and squeezing said malleable assembly being carried out by first bonding to each other at least one layer of each of said constituents to form a sub-assembly and then repeating, in succession, the steps of first superimposing a portion of said sub-assembly upon itself and subsequently bonding the mutually adjacent surfaces of the superimposed sub-assembly and reducing the thickness of each of the layers.

4. The method as set forth in claim 3 wherein said layers are stacked with at least a portion of one of said constituents in the form of layers of powder disposed between solid layers of at least one of said constituents.

5. The method comprising the steps of providing a malleable assembly of a plurality of metallic layers with mutually adjacent surfaces of said layers in sufficiently intimate contact to prevent the formation thereon of diffusion-obstructing contaminants, each layer being formed of one of a plurality of alloying constituents, capable of forming an alloy by solid state interdiffusion; the layers of each of said constituents being interspersed with those of the other constituents, and at least one of said constituents being insoluble in all other existing phases, and, while said layers are maintained in said intimate contact, cold working said assembly by squeezing the assembly to reduce each of said layers to a thickness sufficiently less than 0.001 of an inch that heterogeneous equilibrium and an alloy of said constituents is attained by subjecting the assembly for a relatively short time interval to a temperature within the range extending from just below the recrystallization temperature of the phase having the lowest recrystallization temperature to just below the melting point of the phase having the lowest melting point, and said steps of providing and squeezing said malleable assembly being carried out by first bonding to each other at least one layer of each of said constituents to form a sub-assembly and then repeating, in succession, the steps of first superimposing a portion of said sub-assembly upon itself and subsequently bonding the mutually adjacent surfaces of the superimposed sub-assembly and reducing the thickness of each of the layers.

6. The method as set forth in claim 5 including the subsequent step of subjecting the squeezed assembly to said temperature within said temperature range for said time interval.

References Cited in the file of this patent

UNITED STATES PATENTS

| | | |
|---|---|---|
| 2,402,834 | Nachtman | June 25, 1946 |
| 2,490,700 | Nachtman | Dec. 6, 1949 |
| 2,664,874 | Graham | Jan. 5, 1954 |
| 2,689,399 | Gray | Sept. 21, 1954 |
| 2,744,314 | Kinney | May 8, 1956 |
| 2,745,172 | Townsend | May 15, 1956 |
| 2,753,623 | Boessenkool | July 10, 1956 |
| 2,767,467 | Siegel | Oct. 22, 1956 |
| 2,793,423 | Stumbock | May 28, 1957 |
| 2,813,332 | Keay | Nov. 19, 1957 |
| 2,834,102 | Pflumm | May 13, 1958 |
| 2,859,158 | Schaer | Nov. 4, 1958 |
| 2,860,409 | Boessenkool | Nov. 18, 1958 |

OTHER REFERENCES

"Surface Treatment of Metals," by Dr. F. A. Morral, pages 272–277 in "Wire," April 1945, published by Wire Association.